United States Patent [19]

Noé

[11] 3,867,826
[45] Feb. 25, 1975

[54] STRETCHER FOR CONTINUOUSLY MOVING STRIP

[75] Inventor: Oskar Noé, Mulheim/Ruhr, Germany

[73] Assignee: BWG Bergwerke-und Walzwerk Maschinenbau G.m.b.H., Duisburg, Germany

[22] Filed: Apr. 30, 1973

[21] Appl. No.: 355,449

[30] Foreign Application Priority Data
  July 21, 1972  Germany............................ 2235833
  Nov. 28, 1972  Germany............................ 2258192

[52] U.S. Cl. ............................... 72/205, 72/249
[51] Int. Cl. .................................... B21b, 39/08
[58] Field of Search ............. 72/205, 160, 249, 675

[56] References Cited
UNITED STATES PATENTS
| | | | |
|---|---|---|---|
| 3,559,431 | 2/1971 | Noe et al. ................................. | 72/8 |
| 3,626,737 | 12/1971 | Defontenay........................... | 72/205 |
| 3,766,767 | 10/1973 | Rastelli................................ | 72/249 |

*Primary Examiner*—Milton S. Mehr
*Attorney, Agent, or Firm*—Albert C. Johnston

[57] ABSTRACT

A stretcher for sheet-metal or like strip passing continuously for treatment under high tension between two tensioning roll stands comprises a common rotary shaft coupling together all the tensioning rolls through respective differential gear trains, one between each roll and the common shaft, and the respective superimposition input gears of all, or of all but one, of the differential gear trains are rotatable and connected with variable torque back-up motors, preferably hydraulic motors actuated from a common high-pressure hydraulic line, whereby torques (braking and/or driving) at desired differential settings are applied through the differential gear trains to the related tensioning rolls. In an advantageous development of the invention, one of the differential gear trains has a fixed superimposition input gear, and a driving motor is connected with at least one of the tensioning rolls, or with the common coupling shaft, for rotating the tensioning rolls so as to pass the strip through the roll stands.

10 Claims, 5 Drawing Figures

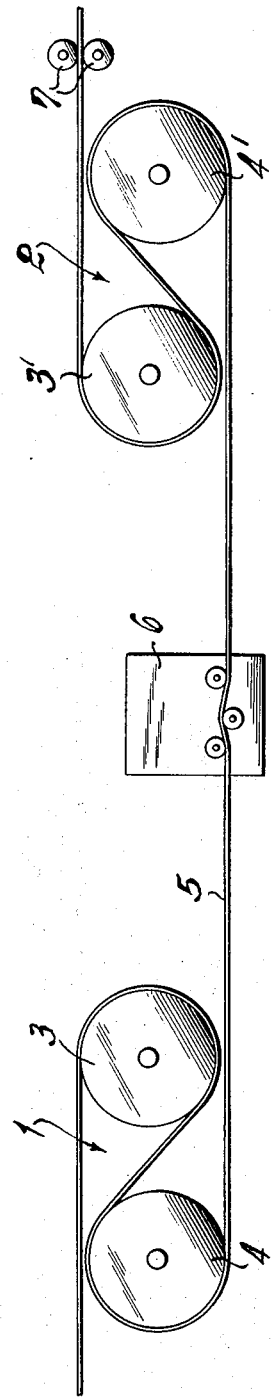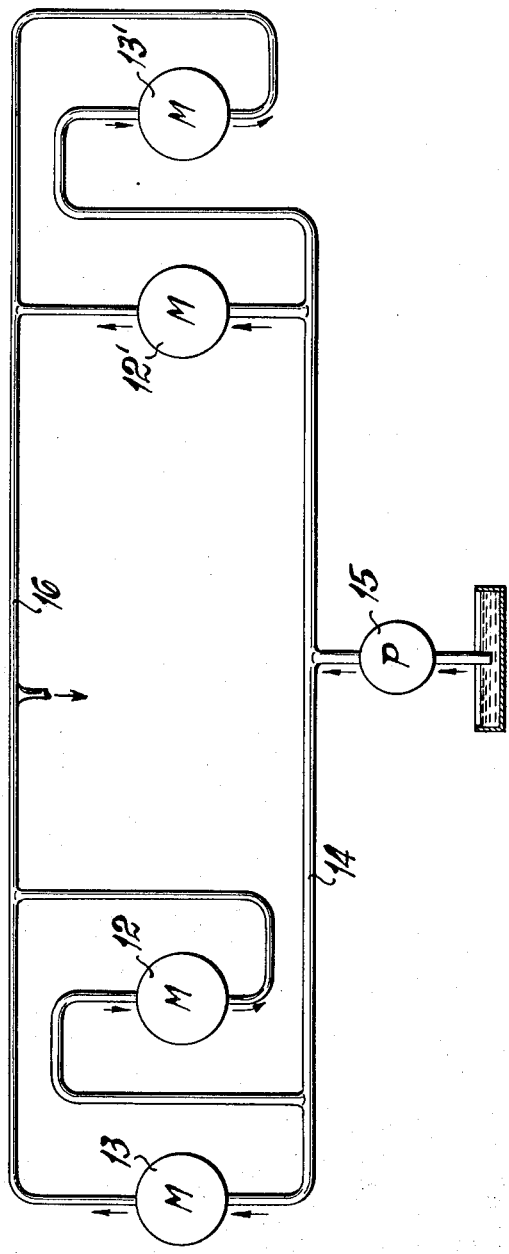

STRETCHER FOR CONTINUOUSLY MOVING STRIP

This invention refers to a stretcher or tensioning system for continuously moving strip such as sheet metal strip, comprising two strip tensioning roll stands the rolls of which are coupled together through differential gear trains. The invention is particularly advantageous in that it enables very high tensions to be produced in the strip at little cost for the improvements attained.

Tensioning systems for sheet metal strip or similarly stretchable strip usually comprise two tensioning roll stands through which the strip is passed continuously. Such systems are used for strip straighteners, stretchers, skinning stands, picklers, galvanizing lines and so on. They have been developed to operate with power transmissions of the order of 1,000 HP and over, and various means are employed for tensioning the strip.

In one known system the rolls of the downstream tension stand are driven at a higher speed, the degree of which depends upon the required degree of stretch. For this purpose the rolls of the first or upstream tension stand and those of the downstream tension stand are coupled positively to spur gears which in turn are coupled together through a differential gear driven by a motor. Such a system, however, has the disadvantage that the strip to be stretched is likely to be impaired because of its tension not being uniform between the tensioning rolls of each tension stand. In all stretchers of this kind there occurs in fact, to an extent depending upon the frictional resistance and the torques of the tensioning rolls, an elongation of the strip which steadily increases downstream from the input roll of the first tension stand. The subsequent tensioning rolls, being of uniform diameters must therefore run respectively faster and faster for equalization of the strip tension. A further disadvantage consists in that the torques transmitted to the individual tensioning rolls are indeterminable; it is even possible that the whole of the torque will be taken entirely by one of the tensioning rolls while the others receive no torque at all. consequently the tensioning rolls restrain one another and cause the spur gear couplings and also the differential gear to become overloaded, so that the gear units become unserviceable within a relatively short time.

In another known system, the tensioning rolls of each tension stand are coupled together hydraulically by providing a hydraulic motor for each tensioning roll and actuating all the hydraulic motors from a common high-pressure hydraulic supply line. In such an hydraulic system the tensioning rolls of the first tension stand receive a braking torque and those of the second tension stand receive a driving torque. The strip tension can therefore be set as required, both with the strip at rest and independently of the driving of the strip, by adjusting the pressure in the high-pressure line. The driving of the strip in this case is effected either by special driving means or by providing appropriate switching elements in the hydraulic system. This known hydraulic system, however, introduces difficulties, particularly if high tensions of the order, for example, of over 30 Mp are to be produced, since the quantity of oil required to be kept in circulation amounts to several thousand liters per minute and extensive piping, cooling and filtering systems are necessary.

The principal object of the present invention is to eliminate the above mentioned disadvantages and difficulties of known strip stretching systems, and to provide a tensioning system for continuous strip which enables the strip to be stretched, and/or otherwise treated under high tensions with relatively small outlay for the required machinery and equipment.

This object is achieved in accordance with the invention by a system of strip tensioning roll stands in which the individual tensioning rolls are coupled to a common shaft through a differential gear train for each roll and the respective superimposition input (ring) gears of the differential gear trains, or of all but one of them, are each connected with a variable torque back-up motor by which the torque of the related tensioning roll may be preset and may be adjusted as and whenever required.

In a stretcher embodying this system, the rolls of the tension stands are coupled positively together mechanically, and the required equalization and setting of the strip tension are effected through the differential gear trains associated with respective tensioning rolls. The system enables setting of the strip tension both when the strip is at rest and also while it is being driven by an appropriate driving mechanism which can be, for example, a roller drive arranged at a desired point in the path of the strip ahead of, beyond, or between the tension stands.

Since the back-up motors are each adjustable to apply any required torque, the torque required for each tensioning roll can be set exactly. The back-up motors normally act on the differential gear trains like a brake having no driving action, i.e., with zero power output.

The back-up motors can be electric motors but preferably they are variable-torque hydraulic motors. When hydraulic motors are used they are connected to a common high-pressure hydraulic line and are adjusted to different gradations or settings of torque. In this way, the advantage is achieved that with a uniform application of hydraulic pressure the motors will produce the torque gradations required at their respective positions in the path of the strip, and the magnitude of the strip tension produced is adjustable over a wide range by adjustment of the pressure in the common high-pressure line. The adjustment of the pressure is preferably effected by a variable-pressure pump provided in the high-pressure line.

To compensate for elongation of a strip being stretched, the rolls of the downstream tension stand are given a speed of rotation correspondingly higher than that of the entry rolls. Their speed usually is between 2 and 10% greater. The required speed difference can be maintained by causing the differential gear trains of the tensioning rolls of the downstream tension stand to transmit the required additional power, which amounts usually to 2 to 10% of the power required for tensioning the strip. This additional power can be produced by the variable pressure pump in an hydraulic torque control system as only 2 to 10% of the total power requirement needs be transmitted hydraulically. Thus, costly hydraulic driving devices are not required yet an exact distribution of torque with the required differential action between all the tensioning rolls remains assured.

The simple setting of the strip tension by means of torque controlling back-up motors having only a small power output is a particularly advantageous feature of the invention. These motors can be set one relative to another in respect of the torque levels to be maintained at the differential gears trains so that only a small torque remains to be supplied for the back-up motors which act as superimposed drives. The back-up motors can therefore be kept very small.

The invention is also applicable advantageously to a strip tensioning installation, as for a stretcher for sheet metal strip, in which some of the tensioning rolls act to feed the strip by being driven from a driving motor. For such an embodiment, the superimposition input gear of the differential gear train of one of the strip tensioning rolls is fixed instead of being controlled by a back-up motor. In consequence of this, several advantages can be realized.

One advantage is that one of the back-up motors is omitted and a simple gear employed instead, this being practicable since the back-up torque for one of the differential gear trains is self-adjusting.

Another advantage of considerable importance consists in that, since each back-up motor is adjustable exactly to a predetermined torque and the torques of the several back-up motors are gradated according to the actual torques of the tensioning rolls, the torques of all the tensioning rolls including the one having a fixed differential gear train equalize mirrorwise. This torque distribution assures that the torque from roll to roll increases according to the formula $S_2 = S_1 e$ in the first or upstream tension stand and decreases mirrorwise in the output or downstream tension stand; hence no slipping of the strip occurs on the tensioning rolls.

A further important advantage of the use of a fixed differential gear train at one of the rolls is that a main drive for feeding the strip can be integrated directly into the torque-controlling mechanical system that positively couples together the several differential gear trains. The presence of a differential gear that is not torque limiting allows an additional driving torque to be applied through the tensioning rolls.

In accordance with this development of the invention, the common shaft that couples together the differential gear trains is provided in known manner with a driving motor. This driven shaft advantageously determines entirely the torque of the tensioning roll provided with the fixed differential gear train and at the same time effects the mechanical positive coupling of the other differential gear trains set at predetermined torques. The differential gear trains provided with back-up motors keep the preset torques constant, so that the required tension in the sheet metal strip between the tensioning rolls and hence also the required degree of stretch is obtained with certainty, that is, independently of whether or not the driving motor is taking up a driving torque on the common shaft. The required tensioning thus is maintained constant both with the strip at rest and also at all strip speeds, while the required differential action between the tensioning rolls is assured by the instantaneously torque-regulating back-up motors.

A further feature of this embodiment of the invention is that the basic gear ratio at the tensioning roll having the fixed differential gear is made greater or smaller than the basic gear ratio at the other tensioning rolls. The difference between these basic gear ratios is advantageously made larger (e.g., by about 0.5 – 5%) than the maximum (percentage) stretch in the strip passing between the tension stands, so that the back-up motors do not have to pass through zero rpm. This has the important advantage that the back-up motors have to apply forward or backward rpm compensating for a difference between the gear ratios. If the basic ratio of the differential gear train having the fixed gear is smaller than that of the other differential gear trains the back-up motors must apply additional rpm, i.e., act as driving motors; if on the contrary it is larger, the back-up motors must reduce the rpm of the associated tensioning rolls, in which case they work as generators or as pumps in the case of hydraulic drive. Since the back-up motors are thus always running, the so-called slip-stick effect is avoided.

The invention will be further understood from the following detailed description and the accompanying drawings of illustrative embodiments thereof. In the drawings:

FIG. 1 is a diagrammatic side elevation of a tensioning and stretching installation for metal strip;

FIG. 3 is a schematic view of a hydraulic circuit for the back-up motors of the apparatus

Figure 2:
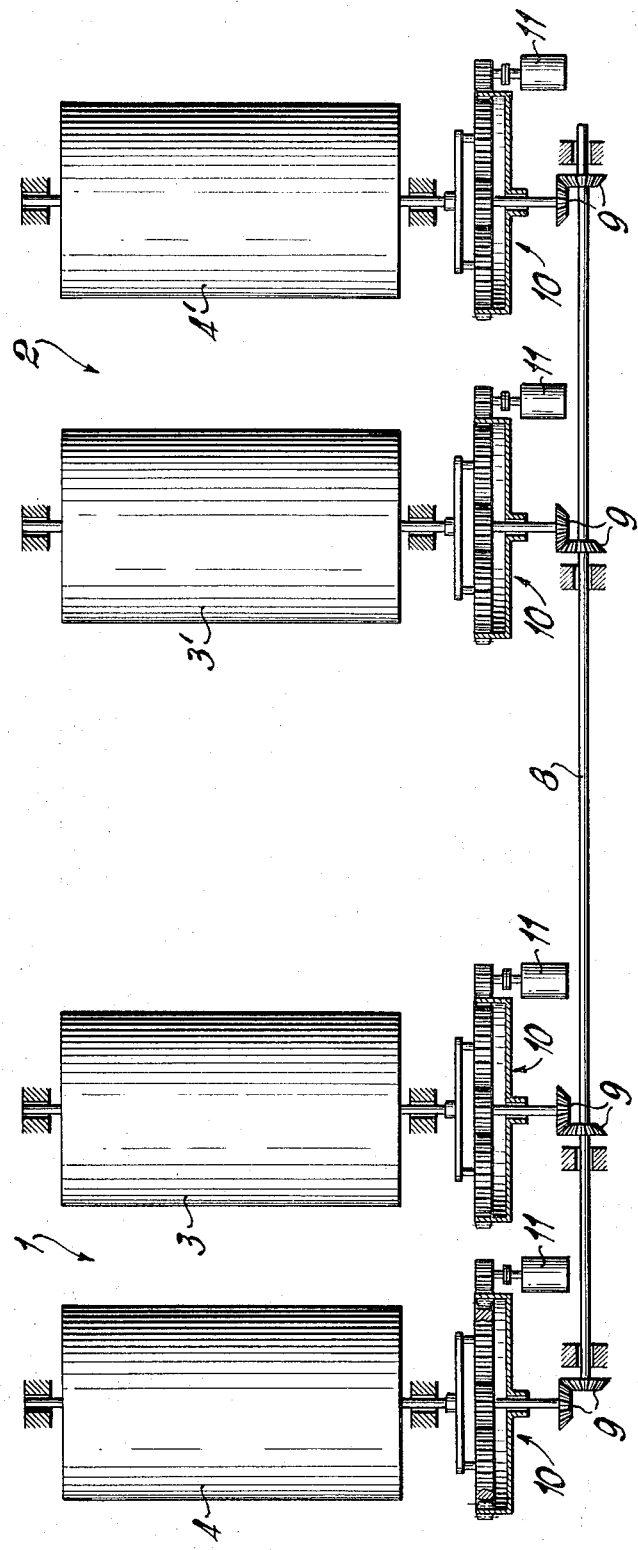
FIG. 2 is a diagrammatic plan view of the strip tensioning rolls and their coupled differential gear trains.

The apparatus illustrated in FIGS. 1–3 comprises two groups or stands 1 and 2 of strip tensioning rolls, which are arranged in a frame (not shown). It is also practicable to provide three or more tensioning rolls in each of the tension stands. The first or upstream tension stand as shown has two rolls 3 and 4. The second or downstream stand has two similar rolls 3' and 4'. The strip 5, typically sheet metal strip, wraps around the tensioning rolls 3 and 4 and passes from them, according to the present embodiment, first through a stretcher stand 6 arranged between the two groups of rolls and then around the rolls 4' and 3' of the second group. For the feeding of the strip a strip drive is provided which in the present embodiment comprises a pair of driving rollers 7. These rollers as shown act on the strip beyond the second stand, but they can be arranged at any point between the groups of rolls or ahead of the whole system. They simply have the function of continuously advancing the strip 5, while the groups 1 and 2 of tensioning rolls establish the tension required in the strip passing between these tension stands. As shown in FIG. 2 all the tensioning rolls of the two groups 1 and 2 are coupled together by a common shaft 8 with which each of these rolls is connected through a bevel gear set 9 coupled to shaft 8 and an epicyclic differential gear train 10. The central spur gear of each differential gear train is rotatable on a shaft with the related bevel gear set, while the arm carrying the epicyclic pinions is rotatable with a shaft of the related tensioning roll. In this way a mechanically positive connection is provided between all the tensioning rolls 3, 4, 3' and 4'. Further, the internal ring gear engaging around the pinions of each differential gear train is provided with a superimposition input gear comprising external teeth engaged by a pinion on the shaft of a backup motor 11. Thus, an input to each gear train from its motor 11 can be superimposed upon its other inputs.

Each of the back-up motors 11 is a torque limiting motor, the torque value of which is adjustable. The tensioning roll torques required for the strip tension to be maintained are produced by adjustment of these motors. Since the tension to be produced in the strip depends upon both the pre-tension and the tension value added by the rolls, each tensioning roll needs only impart a certain tension to the strip, i.e., the torques on the tensioning rolls are mutually determined and determinable. Furthermore, the back-up motors of the differential gears enable variation of the r.p.m. of the tensioning rolls, which may be needed because of the roll diameters not remaining constantly uniform or because of the strip having undergone elastic extension under increasing tension.

In embodiments of the invention wherein all of the differential gear trains are provided with back-up motors, these motors preferably are hydraulic motors such as indicated at 12, 13, 12' and 13' in FIG. 3. In the present embodiment such hydraulic motors are coupled to a common high-pressure hydraulic line 14 which is activated by a pump 15 having an adjustable output pressure. The hydraulic return line is indicated at 16. Accordingly, the required strip tension can be established simply by setting the pressure of the pump 15. In this way the strip tension can be varied when the strip is at rest and also at any speed of movement of the strip.

The back-up motors 11, instead of being hydraulic motors as indicated at 12, 13, 12' and 13', can also be electric motors, e.g., direct current motors.

Furthermore, by appropriate settings of the variable torque back-up motors, it is also possible to perform the driving of the strip by the torques on the tensioning rolls, without the aid of an additional strip driving mechanism. This can be done, for example, by setting an additional driving torque on one of the tensioning rolls of group 2 at the delivery end, so that the sum of (1) the negative torques from the rolls of the first tension stand and (2) the positive torques from the rolls of the second tension stand has a positive value. Conversely, the value of this sum can also be made positive by diminishing the negative torques, and a strip driving action thereby produced. It is also possible to cause the strip to run backward by appropriate settings of the roll torques.

The embodiment of the invention illustrated in FIG. 4 again includes two groups of tensioning rolls with a strip treating stand 6, e.g., a stretcher, acting on a metal strip 5 passing between rolls 3, 4 of the first tension stand and rolls 3', 4' of the second tension stand. In this embodiment, however, motors 17 and 18 are provided for passing the strip 5 through the stretcher by driving the tensioning rolls 3 and 3' respectively via gears 19 and 20. It is also possible to provide strip driving rollers at any point between two tension stands or ahead of or beyond the tension stands. Such driving means serve only for continuously advancing the strip 5, while the two tension stands produce the strip tension required for the treatment of the strip.

Figure 4:
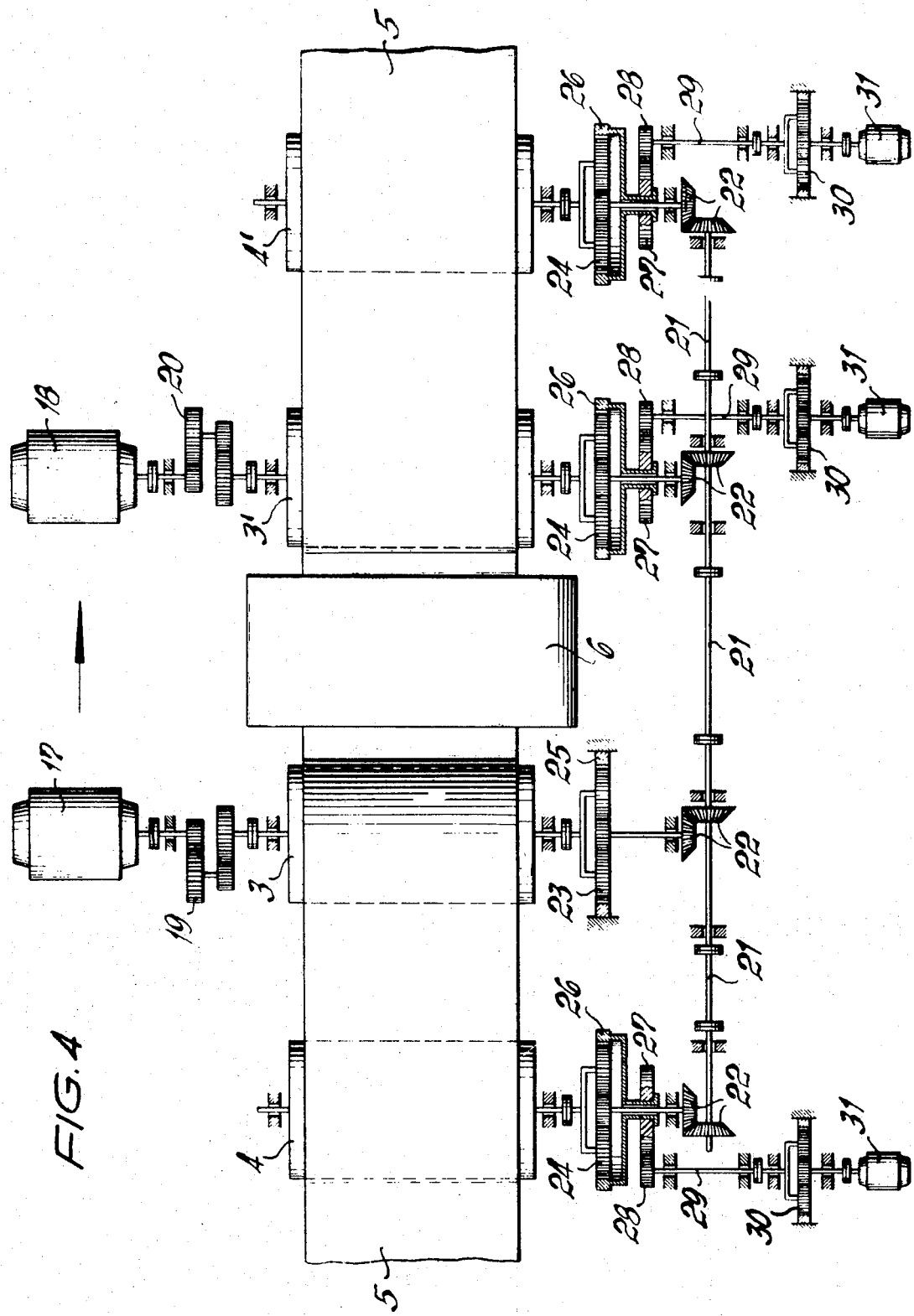
FIG. 4 is a diagrammatic plan view of another embodiment of the invention.

As shown in FIG. 4, the tensioning rolls are coupled together by a common shaft 21 to which each of these rolls is connected through a set of bevel gears 22 and an epicyclic differential gear train 23 or 24. In this embodiment the superimposition input gear 25 of one of the differential gear trains, e.g., of that gear train 23 connected to tensioning roll 3, is fixed, while the superimposition input gears 26 of the other differential gear trains 24 are each connected to a back-up motor 31 through a gear wheel 27, spur gear 28, shaft 29 and fixed differential gear 30.

In the case of this second embodiment the back-up torque by which the required strip tension is produced sets itself automatically. Each back-up motor can be set exactly at a pre-determined torque, while the several back-up motors are graduated in torques according to the torques required from the tension rolls at the time, and the torques of all the tensioning rolls, including the one having the fixed superimposition input, equalize mirrorwise. Thus, in the case of the arrangement shown in FIG. 4 the torques of the tensioning rolls 3 and 3' on the one hand and of the tensioning rolls 4 and 4' on the other hand mutually equalize mirrorwise. This torque distribution ensures that the torque at the entry tension stand increases from roll to roll and at the output tension stand decreases mirrorwise.

Figure 5:
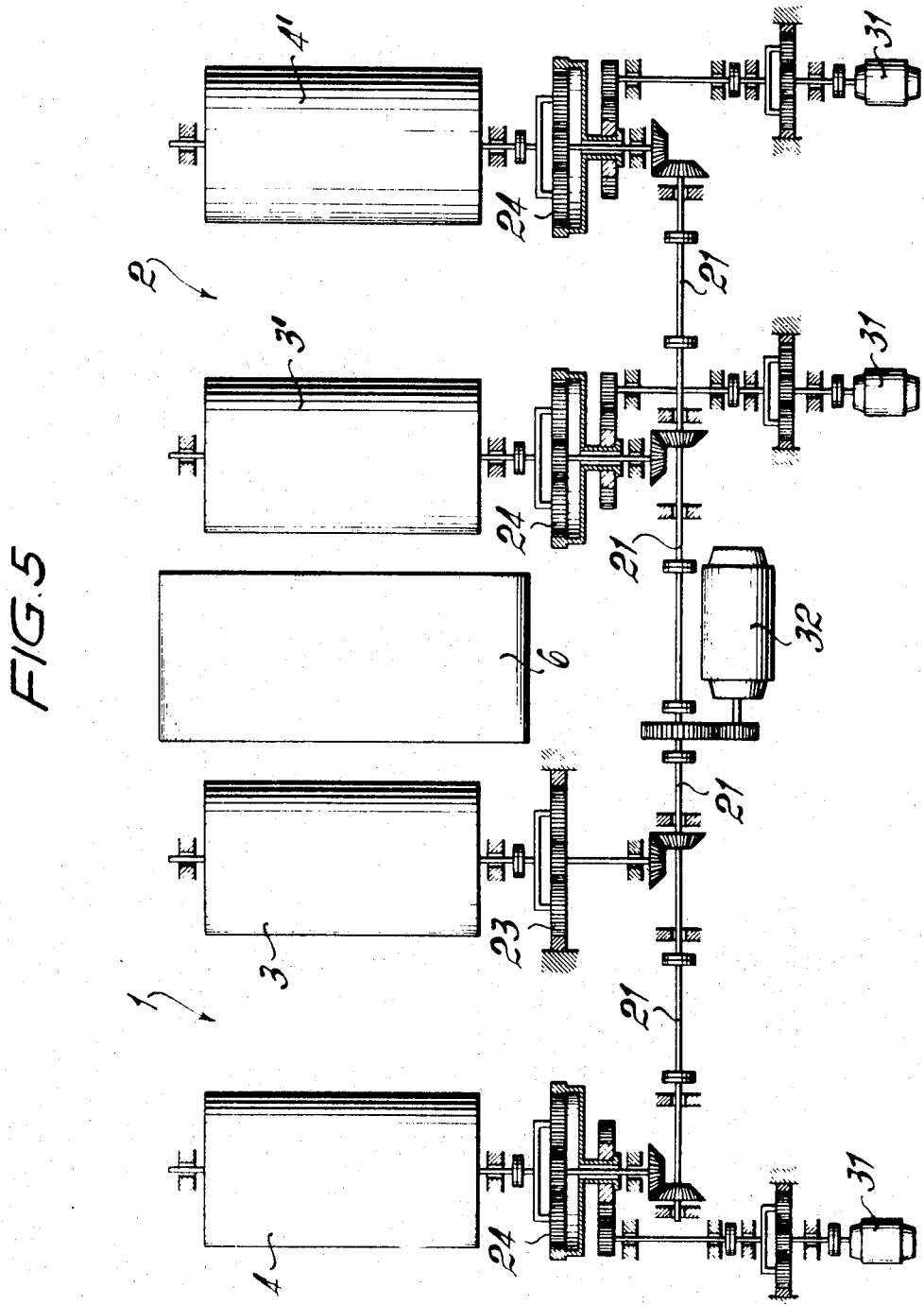
FIG. 5 is a diagrammatic plan view of an embodiment thereof having a driving motor connected with the common shaft of the differential gear trains.

The third illustrative embodiment of the invention as shown in FIG. 5 is similar to the embodiment of FIG. 4 excepting that, instead of the driving motors 17 and 18 for passing the strip through the stretcher, a driving motor 32 is incorporated into the mechanical positive coupling system for this purpose. Motor 32 drives the common coupling shaft 21.

As a result of this modification, the driving motor 32 takes up the additional torque on the differential gear train 23 having the fixed superimposition input, yet the common shaft 21 nevertheless effectuates the mechanical positive coupling of the other differential gear trains 24 set at predetermined torques.

The back-up motors 31 can be of various types. Electric motors such as d.c. motors, eddy-current motors and disc motors are suitable. Screw-spindle pumps which maintain a constant torque as hydraulic motors, are particularly suitable as hydraulic motors. The gear ratio to each back-up motor can be chosen within wide limits, for example, in the range of from 1:100 to 1:1,000.

In order to avoid the so-called slip-stick effect, it is advantageous to assure that the back-up motors in service will run with a certain minimum rpm. For this purpose the basic gear ratio of the differential gear train having the fixed ring gear is designed to differ from the basic gear ratio of the other differential gear trains. Preferably the former of these ratios, as that of the gear train at roll 3, is about 0.5% larger or smaller than the basic gear ratio at the other tensioning rolls, while the latter ratio is approximately equal to the maximum percentage of stretch of the strip between the groups of tensioning rolls.

If the basic gear ratio of gear train 23 is smaller than that of the other differential gear trains 24, the back-up motors 31 must feed in the necessary additional rpm when the installation is running; i.e., all the backup motors 31 then work as motors.

If on the contrary the basic gear ratio of the differential gear train 23 is larger than that of the gear trains 24, the tensioning-roll 3 driven by the motor 32 runs too slowly while the other tensioning rolls 4, 3' and 4' run too fast. So the back-up motors 31 in this case must cut down the rpm by a corresponding reverse rotation, and they therefore work as generators or as pumps in the use of hydraulic back-up motors. The generating or pumping power must then be applied by the driving motor 32.

As an example of the cases above mentioned, the basic gear ratios (i.g.) can be 9.75 for the variable gears and 10 for the fixed gears, or 10 for the variable gears and 9.75 for the fixed gear respectively.

In order to avoid excessive tension when starting operation of the installation in the use of hydraulic back-up motors, a regulating pump can be installed which will vary the quantity of the circulating pressure medium so as to keep its pressure constant.

If the strip driving power should not be adequate because of the wrap friction, the tensioning rolls can be provided with additional drives on the side thereof opposite to to the differential gears trains, these drives being arranged in a manner similar to that shown in FIG. 4 for the driving motors 17 and 18.

The invention is not restricted to the illustrated embodiments, as numerous alterations of them can be employed without departing from the principles of the invention. It is of course practicable to use three or more tensioning rolls instead of two in each of the two tension stands. Other forms of differential gears can be used instead of the epicyclic differential gear train 23 having a fixed superimposition input 25. Furthermore, the fixed differential gear can be associated with any of the tensioning rolls of the stretcher, so long as it is provided for only one of them.

I claim:

1. Apparatus for stretching strip such as sheet metal strip, comprising, in combination with two tensioning roll stands each of which comprises a plurality of strip tensioning rolls about which the strip is passed continuously for treatment under high tension between said stands and means for driving the strip through said roll stands, a common rotary shaft for coupling together all said tensioning rolls, each of said rolls being connected to said shaft through an individual gear train, each of at least all but one of said gear trains being a differential gear train comprising a central spur gear connected for rotation with said common shaft, epicyclic gears rotatable about and in mesh with said spur gear and connected for rotation with the related roll and a rotatable ring gear meshing with said epicyclic gears, and a variable torque back-up motor connected for rotation with each of said rotatable ring gears, each said back-up motor being a torque limiting motor operative at a given setting thereof to maintain a predetermined substantially constant torque on the related tensioning roll through the related differential gear train, the several back-up motors having different torque settings corresponding to the respective differential torques and strip tensions required at said rolls.

2. Apparatus according to claim 1, each said back-up motor being a hydraulic motor.

3. Apparatus according to claim 1, each of said back-up motors being a hydraulic motor and said motors being connected in parallel with a common high pressure hydraulic supply line, said motors respectively having different torque settings which are gradated so that they will maintain at the respective tensioning rolls differential torques having magnitudes determined by the pressure in said supply line.

4. Apparatus according to claim 3, and a variable-pressure pump in said supply line for setting the pressure therein thus the magnitudes of said torques.

5. Apparatus according to claim 1, all of said gear trains being such differential gear trains and said back-up motors connected with their respective ring gears being hydraulic motors, said motors being connected in parallel with a common high-pressure hydraulic supply line having therein a variable-pressure pump for setting the hydraulic pressure applied to them, said motors respectively having different torque settings gradated so that they will maintain at the respective tensioning rolls torques having different magnitudes determined by the pressure in said supply line, the said motors connected with the differential gear trains of the tensioning rolls of the downstream roll stand having torque settings whereby they transmit driving power to those rolls and the strip.

6. Apparatus according to claim 1, there being no rotatable superimposition input gear in said one of said gear trains.

7. Apparatus according to claim 1, there being no rotatable superimposition input gear in said one of said gear trains, said strip driving means including a driving motor connected to at least the one of said tensioning rolls connected to said common shaft through said one gear train, for rotating said at least one roll so as to pass the strip through said roll stands.

8. Apparatus according to claim 1, there being no rotatable superimposition input gear in said one of said gear trains, said strip driving means including a driving motor connected to said common shaft for rotating the same and thereby driving at least said one gear train and the related tensioning roll so as to pass the strip through said roll stands.

9. Apparatus according to claim 8, the basic gear ratio of said one gear train being sufficiently different from the basic gear ratio of the others of said differential gear trains that said back-up motors are always kept in rotation.

10. Apparatus according to claim 9, the first-mentioned basic gear ratio being about 0.5 to 5% greater or smaller than the second-mentioned basic gear ratio.

* * * * *